United States Patent [19]

Daidouji et al.

[11] Patent Number: 4,972,122
[45] Date of Patent: Nov. 20, 1990

[54] FLUORESCENT DISPLAY TUBE HEAD-UP DISPLAY APPARATUS ELIMINATING A HEATED FILAMENT IMAGE OF FLUORESCENT DISPLAY TUBE

[75] Inventors: Shigetoshi Daidouji, Atsugi; Masafumi Nagami, Saitama, both of Japan

[73] Assignees: Nissan Motor Co., Ltd., Yokohama, Japan; Kanto Seiki Co., Ltd., Ohmiya, Japan

[21] Appl. No.: 350,194

[22] Filed: May 11, 1989

[30] Foreign Application Priority Data

May 13, 1988 [JP] Japan ................. 63-116417

[51] Int. Cl.$^5$ .......................................... H05B 37/00
[52] U.S. Cl. ................... 315/106; 340/705
[58] Field of Search .............. 315/77, 105, 106, 107, 315/209 R, 225; 340/705

[56] References Cited

FOREIGN PATENT DOCUMENTS

| 50-73138 | 6/1975 | Japan . | |
|---|---|---|---|
| 0105734 | 5/1987 | Japan | 340/705 |
| 0020242 | 1/1988 | Japan | 340/705 |

OTHER PUBLICATIONS

"Jidosha Gijitsu", vol. 42, published 1988, pp. 212–217, Journal of the Society of Automotive Engineers of Japan.

*Primary Examiner*—Robert J. Pascal
*Attorney, Agent, or Firm*—Foley and Lardner, Schwartz, Jeffery, Schwaab, Mack, Blumenthal and Evans

[57] ABSTRACT

In a head-up display apparatus for a vehicle, there are employed, a fluorescent display tube having a filament, a grid, and an anode positioned in a predetermined positional relationship; a power supply circuit for supplying a filament current to the filament of the tube and an anode voltage to the anode thereof; a display controller coupled to a display switch, for controlling the display tube so as to display various information of a vehicle on the display tube in response to a vehicle information signal and a switch signal of the display switch, the display switch being operated so as to display/erase the various information on/from the tube; and, a synchronized switching unit for controlling the supply of the filament current to the filament from the power supply circuit in synchronism with the switching signal of the display switch supplied from the display controller. As a result, when the display switch is turned off, a heated filament image of the filament no longer appears on a windowshield of the vehicle.

6 Claims, 3 Drawing Sheets

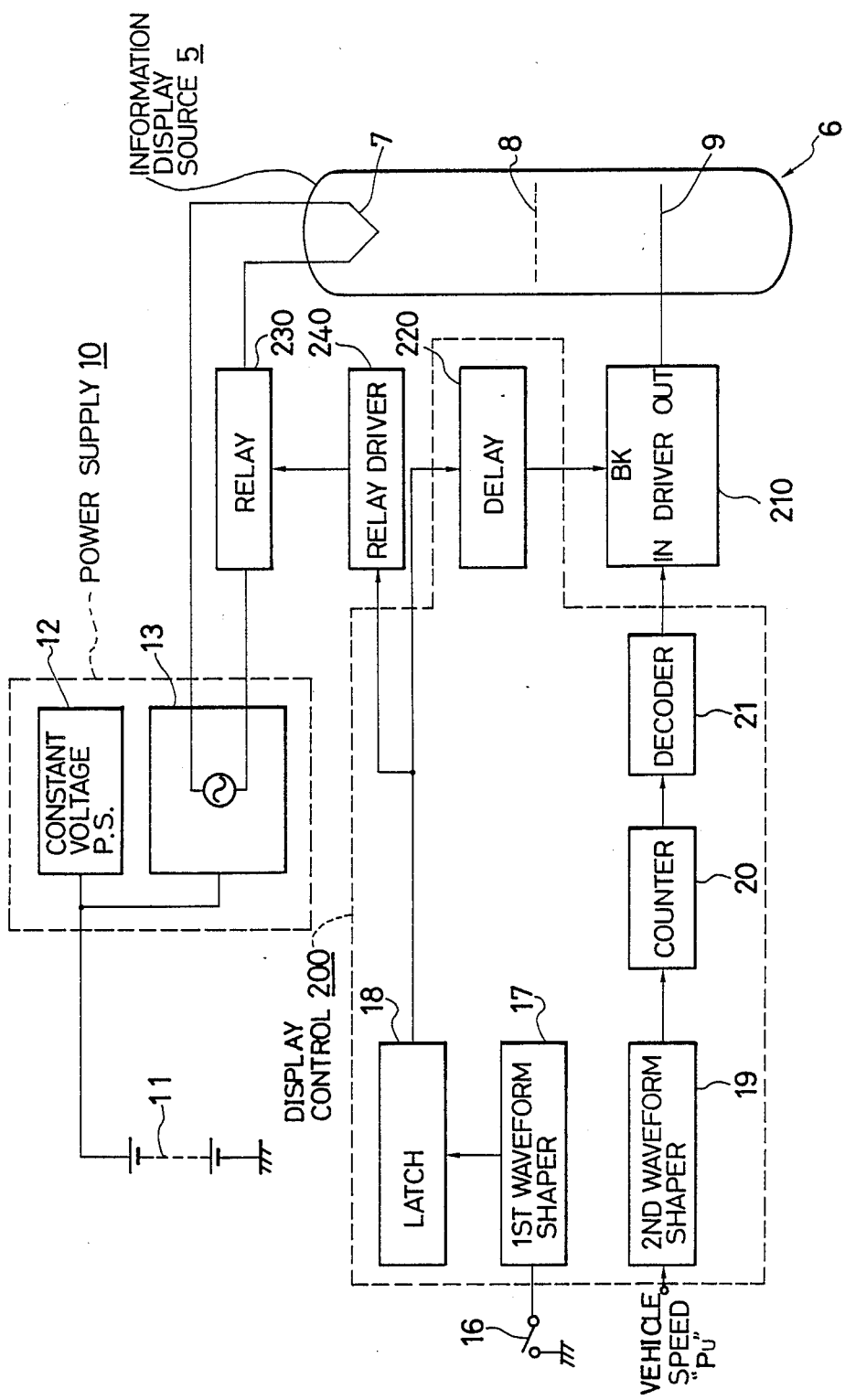

FLUORESCENT DISPLAY TUBE HEAD-UP DISPLAY APPARATUS ELIMINATING A HEATED FILAMENT IMAGE OF FLUORESCENT DISPLAY TUBE

BACKGROUND OF THE INVENTION

1. Field of the Invention

The present invention generally relates to a head-up display apparatus employing a fluorescent display tube capable of displaying various data of an automobile such as a vehicle velocity and an engine revolution speed. More specifically, the present invention is directed to a head-up display apparatus from which a heated filament image of the fluorescent display tube is completely eliminated while the display apparatus is turned off.

2. Description of the Related Art

A head-up display apparatus employing a fluorescent display tube described in the preamble is known from, for instance, Japanese KOKAI (DISCLOSURE) utility model application No. 50-73138 opened in 1975. Referring now to FIGS. 1 and 2, one conventional head-up display apparatus will be summarized. FIG. 1 illustrates the head-up display apparatus installed inside an automobile 1. Within the automobile 1, there is provided an instrument panel 2 which forms a front wall therein. A windowshield 3 is positioned above the instrument panel 2 at a predetermined inclined angle with respect to a vertical line of FIG. 1. A concave 4 is formed in the instrument panel 2, in which an information display source 5 is provided. As this information display source 5, a fluorescent display tube 6 is employed (see FIG. 2), which is disclosed in Japanese magazine "JIDOSHA GIJITSU" on pages 212 to 217, published in 1988, vol. 42. The fluorescent display tube 6 includes a filament 7, a grid 8, and an anode 9 with a known positional relationship. As shown in the circuit of FIG. 2, the filament 7 is connected via a power supply circuit 10 to a battery 11. In the power supply circuit 10, there are employed a constant voltage power source 12 and a filament power source 13.

On the other hand, to the anode 9 of the fluorescent display tube 6, a driver circuit 14 is connected, and also connected to a normally-ON switch 16 via a display control circuit 15. The display control circuit 15 includes a first waveform shaping circuit 17 for receiving an ON signal from the display switch 16, a latch circuit 18 connected to the first waveform shaping circuit 17, a second waveform shaping circuit 19 for accepting a vehicle speed pulse "$P_U$", a counter circuit 20, and a decoder circuit 21 series-connected to the second waveform shaping circuit 19 and counter circuit 20.

With the above-described circuit arrangement, when the switch 16 in turned ON (i.e., the first waveform shaping circuit 17 is grounded) for driving the automobile 1. While the latch circuit 18 is under off-condition, if the normally-ON switch 16 is turned ON (connected), the off-condition of the latch circuit 18 is inverted and this inverted condition is stored therein, and thus the latch circuit 18 energizes the driver circuit 14 so as to apply an anode voltage to the anode 9. A filament voltage is applied to the filament 7 from a filament power source 13 of the power supply circuit 10 so as to accelerate thermal electrons and project them to the anode 9. Under the above-described conditions, the vehicle speed pulse "$P_u$" is entered via a second waveform shaping circuit 19, a counter circuit 20, and a decoder circuit 21 to the above-described driver circuit 14 while driving the vehicle. The fluorescent display tube 5 displays a present vehicle speed, and thus the displayed vehicle speed image is optically projected onto the windowshield 3. As a consequence, a car driver can recognize the present vehicle speed based upon the above-described image projected onto the window-shield 3 while observing a front forward driving view field with a small viewing movement. If the switch 16 is turned off with maintaining the ON-condition of the latch circuit 18, the on-condition of the latch circuit 18 is inverted into the off-condition, and the off-condition thereof is stored in the latch circuit 18, and therefore the driver circuit 14 is disenergized. As a result, the anode potential becomes zero and thus the vehicle speed image projected onto the window shield 3 will disappear.

In the above-described conventional head-up display apparatus, there are the following drawbacks, because the representation and also erase of the image projected onto the windowshield are controlled by switching the display switch 16 so as to control the anode voltage via the driver circuit 14. More specifically, even when the vehicle speed image is erased by turning off the switch 16, the filament current is continuously supplied to the filament 7 from the power supply circuit 10, whereby the heating condition of the filament 7 of the fluorescent display tube 5 is still maintained. As result, when in particular, an indoor of a vehicle becomes dark such as in a tunnel, the heated image of the filament 7 is projected onto the windowshield 3, and therefore a car driver has to watch such a disturbance image while observing a front forward direction. This may cause driver's eyes to be tired.

SUMMARY OF THE INVENTION

The present invention has been made in an attempt to solve the above-described problems of the conventional fluorescent display tube type head-up display apparatus, and therefore has an object to provide a fluorescent display tube type head-up display apparatus where the heated filament image of the display tube is completely erased by interrupting the supply of the filament current to the filament while the display of the various data such as the present vehicle speed is interrupted by turning off the display switch.

A fluorescent display tube type head-up display apparatus, according to the present invention, comprises:

a fluorescent display tube (6) having a filament (7), a grid(8), and an anode(9) positioned in a predetermined positional relationship;

power supply means (10) for supplying a filament current to the filament (7) of the tube (6) and an anode voltage to the anode (9) thereof;

display control means (200) coupled to a display switch (16), for controlling the display tube (6) so as to display various information of a vehicle (1) on the display tube (6) in response to a vehicle information signal ($P_U$) and a switch signal of the switch (16), said switch (6) being operated so as to display/erase the various information on/from the display tube (6); and, synchronized switching means (230:240) for controlling the supply of the filament current to the filament (7) from the power supply means (10) in synchronism with the switching signal of the display switch (16) supplied from the display control means (200), whereby when the display switch (16) is turned off, a heated filament image of the filament (7) no longer appears on a windowshield (3) of the vehicle (1).

BRIEF DESCRIPTION OF THE DRAWINGS

For a better understanding of the above-described invention, reference is made to the following descriptions in conjunction with the accompanying drawings in which.

DETAILED DESCRIPTION OF THE PREFERRED EMBODIMENTS

CONSTRUCTION OF HEAD-UP DISPLAY APPARATUS

Figure 1:
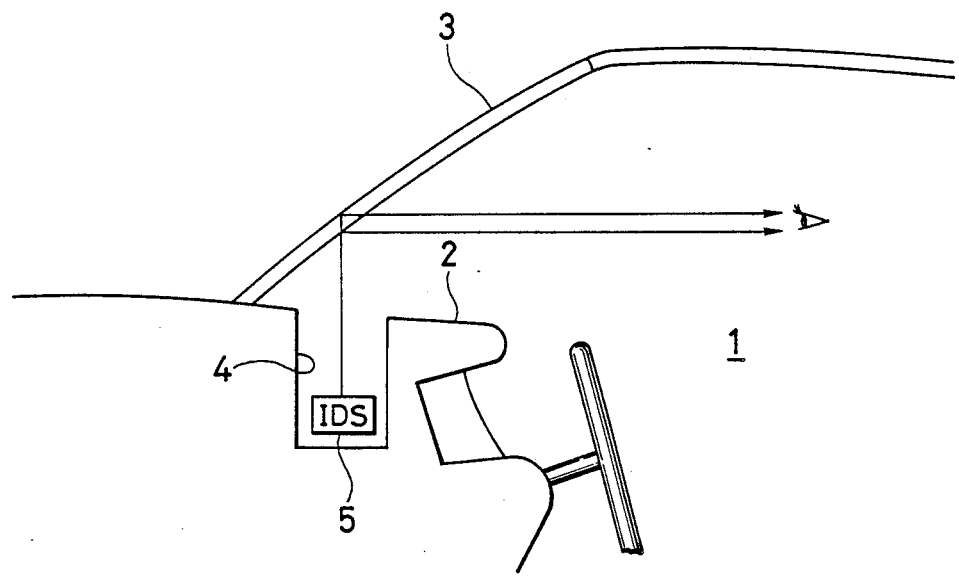
FIG. 1 schematically illustrates a conventional head-up display apparatus.
Figure 2:
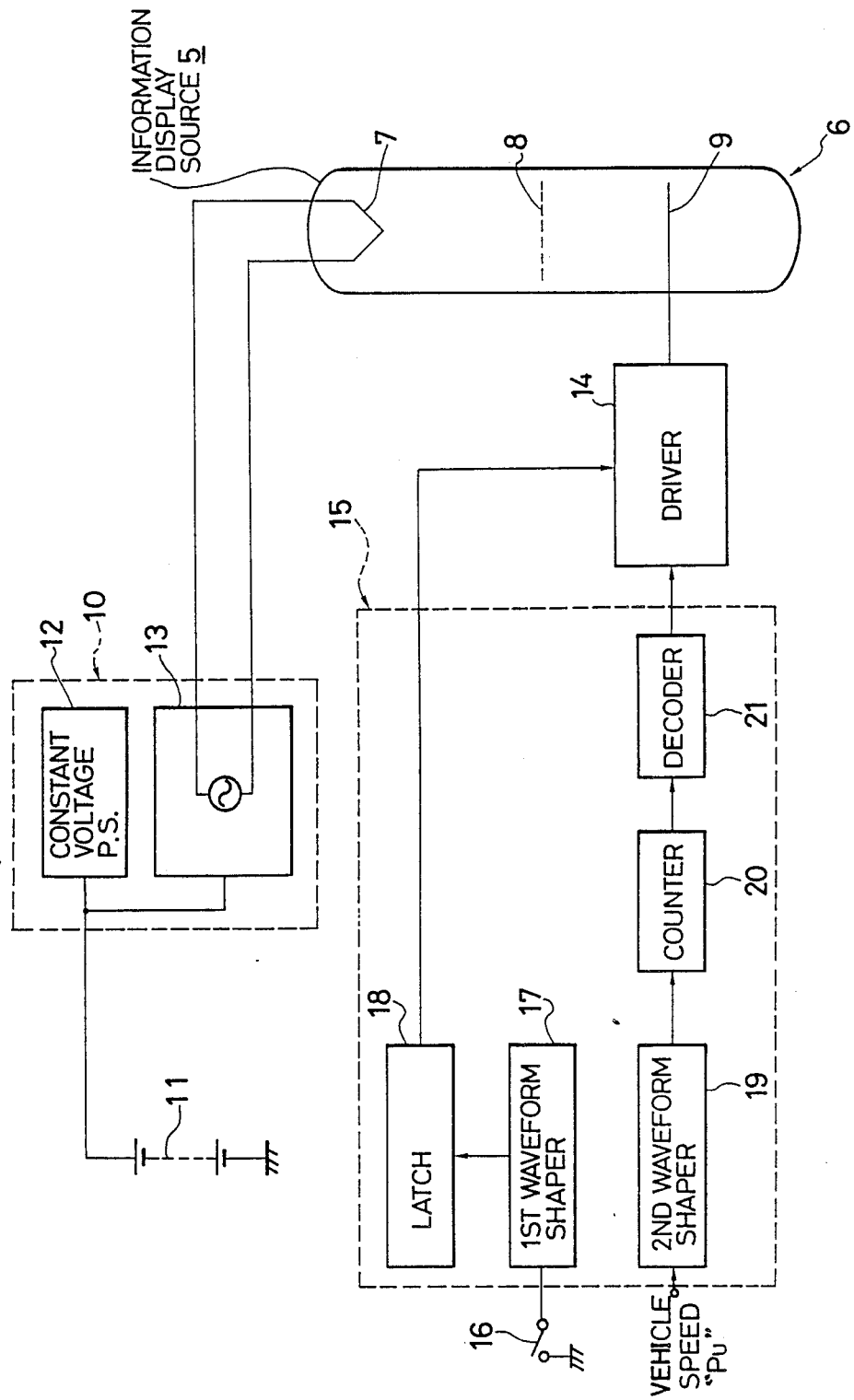
FIG. 2 is a schematic block diagram of a circuit arrangement of the conventional head-up display apparatus shown in FIG. 1; and, FIG. 3 is a schematic block diagram of a circuit arrangement of a head-up display apparatus according to a preferred embodiment of the invention.

A construction of a fluorescent display tube type head-up display apparatus according to a preferred embodiment of the invention will now be summarized with reference to FIGS. 1 and 3. It should be noted that same reference numerals employed in FIGS. 1 and 2 will be used for representing the similar or same circuit elements in FIG. 3.

As previously described with reference to FIG. 1, the instrument panel 2 forming the front wall is constructed in the automobile 1. The windowshield 3 is positioned above the instrument panel 2 at a certain inclined angle with respect to the vertical line of the drawing. The concave 4 is formed in the instrument panel 2. Within this concave 4, the information display source 5 is installed. Although not shown in FIG. 2, an overall circuit arrangement of a head-up display apparatus according to a preferred embodiment of the invention is also installed in the instrument panel 2.

CIRCUIT ARRANGEMENT OF HEAD-UP DISPLAY APPARATUS

Similarly, a fluorescent display tube 6 is employed as the above-described information display source 5. The fluorescent tube 6 is constructed of the filament 7, grid 8 and cathod 9. The filament 7 is connected via the power supply circuit 10 to the battery 11. The power supply circuit 10 employs the constant voltage power source 10 and filament power source 13. The anode 9 is connected to an output terminal "OUT" of a tube driver circuit 210 including a blanking terminal "BK". The function of this blanking terminal "BK" is as follows. When an off-signal, namely blanking pulse is received from the latch circuit 18 via a delay circuit 220, the driver circuit 210 prohibits the supply of the driving voltage to the anode 9 of the fluorescent display tube 6 (will be discussed later.) An input terminal "IN" of the driver circuit 210 is connected to the decoder circuit 21 of a display control circuit 200, whereas the blanking terminal "BK" thereof is connected via the delay circuit 220 and latch circuit 18 to the display switch 16.

Similarly, when the normally-open display switch 16 is turned ON(closed), the previous condition of the latch circuit 16 is inverted into an opposite condition and the inverted condition is stored (held) in this latch circuit. In general, the previous condition of the latch circuit 16 corresponds to the off-condition, so that when the display switch 16 is turned on (closed), the off-condition of the latch circuit 18 is inverted into the on-condition which is held therein. The delay circuit 220 is actuated only when the output condition of the latch circuit 18 is changed from off to on. The major function of this delay circuit 220 is to apply the anode voltage to the anode 9 via the driver circuit 210 after the filament 7 is sufficiently heated.

Also, the vehicle speed pulse "$P_U$" is applied to the input terminal "IN" of the driver circuit 210 via the above-described series-connected circuit of the second waveform shape 19, counter 20, and decoder 21.

As shown in FIG. 3, a relay 230 is interposed between the filament power source 13 and the filament 7 of the fluorescent display tube 6. The relay 230 is controlled by a relay driver circuit 240 which receives the output signal from the latch circuit 18. Both the relay 230 and relay driver circuit 240 function as a synchronized switching means.

HEATED FILAMENT IMAGE CONTROLLING OPERATION

When the display switch 16 is turned ON (closed) under the condition that the latch circuit 18 maintains the off-condition for driving the automobile 1, this off-condition of the latch circuit 18 is reversed, i.e., the on-condition. This on-condition is held by the latch circuit 18, and thus the relay driver circuit 240 is energized. As a result, the relay 230 is turned on (the contact thereof is closed), and also the latch circuit 18 enables the tube driver circuit 210 to be actuated after a predetermined time delay is made by the delay circuit 220, whereby the anode voltage is applied to the anode 9 of the fluorescent display tube 6.

Then, since the filament 7 is heated via the relay 230 by the filament power source 13 of the power supply circuit 10, the thermoelectrons are accelerated by the anode voltage and therefore impinge onto the anode 9. Thus, the fluorescent display tube 6 of the information display source 5 is initialized.

Thereafter, the vehicle speed pulse "$P_U$" is produced while driving the automobile 1, and applied via the second waveform shape 19, counter 20, and decoder 21 of the display control circuit 200 to the input terminal "IN" of the tube driver circuit 210. Accordingly, the fluorescent display tube 6 displays a numerical value corresponding to the present vehicle speed thereon, and the numerical value is projected as the present vehicle speed image onto the windowshield 3. Then, a car driver (not shown in detail) can readily observe the present vehicle speed optically projected on the windowshield 3.

When the car driver decides to stop the display of the present vehicle speed, he turns off the display switch 16. In this case, the latch circuit 18 has maintained the on-condition before turning off this switch 16. Upon turning off the display switch 16, the latch circuit 18 sends the blanking pulse via the delay circuit 220 to the blanking terminal "BK" of the tube driver circuit 210. Then, the operation of the tube driver circuit 210 is immediately interrupted so that the potential of the anode 9 becomes zero. The vehicle speed image displayed (projected) on the windowshield 3 is erased (disappears) and also the relay driver circuit 240 is energized in synchronism with the turn-off of the display switch 16, so that the relay 230 is turned off, the contact of which is opened. It should be noted that since the delay circuit 220 delays its operation only under the specific condition, i.e., OFF- to ON- changing condition, the switching operation of the display switch 16 is immediately transferred via the latch circuit 18 and delay circuit 220 to the tube driver circuit 210.

As a consequence, upon turning off the display switch 16, the supply of the filament current, from the filament power source 13 to the filament 7 via the contact of the relay 230 is immediately interrupted, with the result that the heated filament image is no longer displayed on the windowshield 3. That is to say, when the projected vehicle speed image disappears from the windowshield 3, the heated filament image also disappears therefrom, which can prevent the car driver's eyes from being tired who is watching the front forward driving direction through the windowshield 3.

The operation of the head-up display apparatus according to the preferred embodiment of the invention will now be summarized.

When the normally-open display switch 16 is turned on (i.e., closed), the relay driver circuit 240 is immediately energized to actuate the relay 230, so that the filament 7 of the fluorescent display tube 6 starts to be heated. After a predetermined delay time, the anode voltage is applied to the anode 9 of this tube 6. Thus, the fluorescent display tube 6 is initialized, and therefore capable of displaying various vehicle's information such as a present vehicle velocity.

When the normally-open display switch 16 is turned off (open), the relay driver circuit 240 is immediately disenergized. As a result, the contact of the relay 230 is opened and the heating of the filament 7 is interrupted. Simultaneously, the anode voltage is no longer applied to the anode 9 of the display tube 6. Accordingly, the heated filament image disturbing a car driver's observation is no longer projected onto the windowshield 3.

As previously described, various vehicle information such as the present vehicle speed and engine revolution speed is imaged on the windowshield 3 by means of the fluorescent phenomenon of the fluorescent display tube 6. The display and erase of such an image are controlled by controlling the anode voltage and filament power source for the fluorescent display tube. When the vehicle information is displayed on the windowshield 3, both the filament voltage and anode voltage are applied to the display tube 6, whereas when such an image is erased, the supply of the filament and anode voltages are interrupted so that no heated filament image is displayed on the windowshield 3, which no longer disturbes the car driver's observation.

What is claimed is:

1. A head-up display apparatus comprising:
   a fluorescent display tube having a filament, a grid, and an anode positioned in a predetermined positional relationship;
   power supply means for supplying a filament current to the filament of the tube and an anode voltage to the anode thereof;
   display control means coupled to a display switch, for controlling the display tube so as to display various information of a vehicle on the display tube in response to a vehicle information signal and a switch signal of the display switch, said display switch being operated so as to display/erase the various information on/from the tube; and,
   synchronized switching means for controlling the supply of the filament current to the filament from the power supply means in synchronism with the switching signal of the display switch supplied from the display control means, whereby when the display switch is turned off, a heated filament image of the filament no longer appears on a windowshield of the vehicle.

2. A head-up display apparatus as claimed in claim 1, wherein said synchronized switching means includes:
   a relay having a contact interposed between said power supply means and said filament of the fluorescent display tube; and,
   a relay drive circuit for driving the relay in response to the switch signal of the display switch supplied from the display control means.

3. A head-up display apparatus as claimed in claim 1, wherein said display control means includes:
   a first waveform shaping circuit for shaping the switch signal of the display switch to obtain a shaped switch signal;
   a latch circuit for inverting a previous condition thereof into an opposite condition and for holding the opposite condition in response to the shaped switch signal; and,
   a delay circuit for delaying an output signal from the latch circuit for a predetermined delay time to supply a delayed switch signal so as to control display operations of the fluorescent display tube.

4. A head-up display apparatus as claimed in claim 3, wherein said display control means further includes:
   a second waveform shaping circuit for shaping the vehicle information signal to produce a shaped vehicle information signal; and,
   a decoder circuit for decoding the shaped vehicle information signal to obtain a decoded vehicle information signal to be supplied to the anode of the display tube.

5. A head-up display apparatus as claimed in claim 4, further comprising:
   a tube driver circuit for driving the anode of the fluorescent display tube in response to the delayed switch signal from the delay circuit, and for displaying the vehicle information on the fluorescent display tube in response to the decoded vehicle information signal from the decoder circuit.

6. A head-up display apparatus as claimed in claim 4, wherein said vehicle information signal is indicative of vehicle velocity information, and said display control means further includes a counter circuit interposed between the second waveform shaping circuit and the decoder circuit, for counting a velocity pulse of the vehicle velocity signal.

* * * * *